(12) United States Patent
Kergosien

(10) Patent No.: US 8,631,805 B2
(45) Date of Patent: Jan. 21, 2014

(54) METHOD FOR MAKING UP THE NAILS AND ARTICLE FOR THE IMPLEMENTATION OF THE METHOD

(75) Inventor: Guillaume Kergosien, Chaville (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 13/388,395

(22) PCT Filed: Sep. 6, 2010

(86) PCT No.: PCT/EP2010/063059
§ 371 (c)(1),
(2), (4) Date: Feb. 1, 2012

(87) PCT Pub. No.: WO2011/029800
PCT Pub. Date: Mar. 17, 2011

(65) Prior Publication Data
US 2012/0132221 A1 May 31, 2012

Related U.S. Application Data

(60) Provisional application No. 61/244,463, filed on Sep. 22, 2009.

(30) Foreign Application Priority Data

Sep. 8, 2009 (FR) ...................................... 09 56114

(51) Int. Cl.
*A45D 24/00* (2006.01)
*A45D 29/00* (2006.01)

(52) U.S. Cl.
USPC ............................................. 132/200; 132/73

(58) Field of Classification Search
USPC ...................... 132/73, 285, 200; 424/61, 401; 428/343, 348, 301.4; 156/212
See application file for complete search history.

(56) References Cited

U.S. PATENT DOCUMENTS

| 3,642,679 A | | 2/1972 | Young | |
|---|---|---|---|---|
| 3,786,821 A | * | 1/1974 | Noskin | 132/200 |
| 4,943,462 A | * | 7/1990 | Komerska et al. | 428/41.3 |
| 5,026,448 A | * | 6/1991 | Reafler et al. | 156/212 |
| 6,481,444 B1 | * | 11/2002 | Lilley | 132/200 |
| 6,613,411 B2 | * | 9/2003 | Kollaja et al. | 428/40.1 |
| 6,828,399 B2 | * | 12/2004 | Lee | 526/264 |
| 6,929,846 B2 | * | 8/2005 | Kamiyama | 428/195.1 |
| 7,098,263 B2 | * | 8/2006 | Mitsunaga et al. | 524/445 |
| 7,150,281 B2 | * | 12/2006 | Han | 132/73 |
| 7,750,073 B2 | * | 7/2010 | Brahms et al. | 524/506 |
| 2003/0031848 A1 | * | 2/2003 | Sawada et al. | 428/220 |
| 2003/0207966 A1 | * | 11/2003 | Ohtsuka et al. | 524/88 |
| 2006/0037624 A1 | * | 2/2006 | Ilekti | 132/73 |
| 2007/0014745 A1 | * | 1/2007 | Arnaud et al. | 424/70.11 |
| 2007/0020205 A1 | * | 1/2007 | Blin et al. | 424/61 |
| 2007/0041920 A1 | * | 2/2007 | Blin et al. | 424/64 |
| 2007/0051384 A1 | | 3/2007 | Fracassi et al. | |
| 2008/0017214 A1 | * | 1/2008 | Han | 132/200 |
| 2008/0081054 A1 | | 4/2008 | Ilekti | |
| 2008/0171005 A1 | * | 7/2008 | Jacques et al. | 424/59 |
| 2008/0251092 A1 | * | 10/2008 | Han | 132/73 |
| 2008/0289646 A1 | | 11/2008 | Fracassi et al. | |
| 2011/0182838 A1 | * | 7/2011 | Vu et al. | 424/61 |
| 2012/0141773 A1 | * | 6/2012 | Kergosien | 428/315.7 |

FOREIGN PATENT DOCUMENTS

BE 1009197 12/1996
FR 2 870 454 11/2005

OTHER PUBLICATIONS

U.S. Appl. No. 13/390,345, filed Feb. 14, 2012, Kergosien.
International Search Report Issued Oct. 12, 2010 in PCT/EP10/63059 Filed Sep. 6, 2010.

* cited by examiner

*Primary Examiner* — Vanitha Elgart
(74) *Attorney, Agent, or Firm* — Oblon, Spivak, McClelland, Maier & Neustadt, L.L.P.

(57) ABSTRACT

The invention relates to a method for making up the nails which consists in adhesively bonding, to the nail, an article comprising a prethermoformed backing composed of at least one first noncrystalline thermoplastic material having a softening temperature T3I and at least one second noncrystalline thermoplastic material not having a softening temperature of less than or equal to TSi, and then heating the article applied to the nail so as to soften the said at least one first noncrystalline thermoplastic material for the purpose of completing the matching of the article to the profile of the nail.

17 Claims, No Drawings

METHOD FOR MAKING UP THE NAILS AND ARTICLE FOR THE IMPLEMENTATION OF THE METHOD

CROSS-REFERENCE TO RELATED APPLICATIONS

This application is a National Stage of PCT/EP10/063,059 filed Sep. 5, 2010 and claims the benefit of U.S. 61/244,463 filed Sep. 22, 2009 and FR 0956114 filed Sep. 8, 2009.

BACKGROUND OF THE INVENTION

1. Field of the Invention

The present invention relates to a method for making up the nails and to an article, in the form of a false nail, for the implementation of the method according to the invention.

2. Description of Related Art

Conventional false nails are provided in the form of relatively stiff articles having specific shapes. Typically, false nails are manufactured with thermoformable plastics, such as acrylonitrile/butadiene/styrene (ABS), indeed even also polyethylene (PE), polypropylene (PP), polyvinyl chloride (PVC), polystyrene (PS) or polyethylene terephthalate (PET). Such materials all exhibit a high softening temperature. The shaping thereof to the profile of the nail is carried out during the manufacture thereof. For this reason, they exhibit a curvature corresponding to the mean curvature of the population targeted for the article. This results in the end in an article about suitable at best for 50% of users. For the others, the false nails do not conform perfectly to the shape of the nails. This results in an aesthetic failure and a make-up result which appears artificial.

This failure in conformity between the profile of the false nail and the profile of the nail results in empty areas between the false nail and the nail, requiring the use, during the attachment to the nail, of a large amount of adhesive in order to fill in the empty area. This gap can also result in problems of hold of the false nail on the nail.

The problems touched on above are not satisfactorily solved by the false nails described in Application US 2008/0289646.

BRIEF SUMMARY OF THE INVENTION

A need thus remains for "universal" false nails capable of following as best as possible the profile of any nail, in particular the profile of nails having a somewhat atypical curvature or exhibiting significant surface irregularities.

In particular, a subject-matter of the invention is the provision of a method which is simple to employ and which leads to an attractive result.

Other subject-matters will appear more specifically in the detailed description which follows.

DETAILED DESCRIPTION OF THE INVENTION

These subject-matters and others are achieved by means of a method for making up the nails which consists in:

i) adhesively bonding, to the nail, an article comprising a prethermoformed backing composed of at least one first noncrystalline thermoplastic material having a softening temperature $T_{S1}$ and at least one second noncrystalline thermoplastic material not having a softening temperature of less than or equal to $T_{S1}$, and then ii) heating the article applied to the nail so as to soften the said at least one first noncrystalline thermoplastic material for the purpose of completing the matching of the article to the profile of the nail.

Thus, during the factory manufacture thereof, the false nails are prethermoformed so as to confer thereon a curvature corresponding, for example, to the mean curvature of the nails of a reference population. Subsequently, in use, the false nails form the subject of another thermoforming stage, at a temperature which is compatible with its employment directly on the nail, so as to complete the precise matching of the false nails with the specific profile of the nails on which they are applied.

This results in a false nail which closely follows the profile of the nail over the entire surface thereof, so that there is perfect adhesion of the false nail to the nail without having to employ a large amount of adhesive.

The second thermoplastic material, due to its physico-chemical properties, gives, in particular by plasticizing it, cohesion to the first material which, at ambient temperature, is very brittle. The article can thus be handled at ambient temperature without the risk of breaking at the slightest impact or at the slightest mechanical stress.

The first noncrystalline thermoplastic material has a softening temperature $T_{S1}$ which is such that effective softening can be obtained by a heating which can be carried out directly on the nail, without burning or damaging the latter. Generally, a nail withstands well (for a period of time which must not, however, be too long) a heating which can range up to 70° C.

According to a preferred implementational embodiment of the method according to the invention, the said at least one first noncrystalline thermoplastic material has a softening temperature $T_{S1}$ of less than 120° C. and preferably of less than 110° C. Unlike materials such as waxes, which generally have a very rapid transition between the solid state and the liquid state, the noncrystalline materials used according to the invention preferably have a longer transition, so that it is not necessary to heat to the softening temperature in order to have the desired matching. In practice, with such materials, it is possible to match them from a temperature not exceeding 60 or 70° C.

The backing according to the invention can additionally comprise a material which is at least partially crystalline, in particular a wax.

The wax can be a polyolefin or an olefin copolymer, preferably a homopolymer or a copolymer of ethylene and/or of propylene.

The article according to the invention comprises a face intended to be in contact with the nail, it being possible for the said face to comprise a layer of an adhesive material.

The ratio of the content of first noncrystalline thermoplastic material(s) to the content of second noncrystalline thermoplastic material(s) can range from 95:1 to 1:8, preferably from 9:1 to 1:3 and more preferably from 4:1 to 1:1.

The method according to the invention can additionally comprise a stage which consists in applying, to a first face of the backing on the opposite side from a second face intended to be brought into contact with the nail, at least one liquid composition comprising at least one ingredient chosen from film-forming agents, plasticizers, solvents, colouring materials and their mixtures. Such compositions are well known and consequently do not require any additional detailed description.

According to another aspect, the present invention is targeted at a make-up article for the implementation of the method according to the invention.

Such an article comprises a prethermoformed backing composed of at least one first noncrystalline thermoplastic material having a softening temperature $T_{S1}$ and at least one second noncrystalline thermoplastic material not having a softening temperature of less than or equal to $T_{S1}$, the softening temperature $T_{S1}$ of the first noncrystalline thermoplastic material being such that, once applied to the nail in its prethermoformed form, the said article can be heated so as to soften the said at least one first noncrystalline thermoplastic material for the purpose of completing the matching of the article to the profile of the nail.

Advantageously, the first noncrystalline thermoplastic material has a softening temperature of less than 120° C. and preferably of less than 110° C.

The article according to the invention, when it is applied to the nail, can exhibit a thickness of between 300 µm and 1 mm and preferably of between 700 µm and 900 µm. Within the meaning of the present invention, the thickness means that of the article as applied to the nail, that is to say freed from the possible protective film or films which, if appropriate, protect the adhesive layer. Neither does this thickness comprise the thickness of the layer of make-up composition which may optionally cover the false nail.

The heating on the nail so as to soften the first noncrystalline thermoplastic material can be carried out, for example, using a hair dryer.

Softening Temperature:

In the context of the present invention, the softening temperature is measured according to the ring-and-ball method according to Standard ASTM D36. Use is made, for this, of a Petrotest® RKA-5 device available from Petrolab. The fluid used for the measurement is chosen according to the softening temperature of the material. Typically, the fluid used will be distilled water for materials exhibiting a softening temperature of less than 80° C., glycerol for materials exhibiting a softening temperature of between 80° C. and 157° C. or a silicone oil for materials exhibiting a softening temperature of between 80° C. and 200° C.

Noncrystalline Thermoplastic Material(s) Having a Softening Temperature $T_{S1}$:

The chemistry of the first noncrystalline thermoplastic material according to the invention can be chosen from many chemistries of polymers, provided that it confers thereon a softening temperature of less than 120° C., preferably of less than 110° C.

The materials targeted according to the present invention are typically materials having a weight-average molecular weight $M_W$<10 000 g/mol.

The first noncrystalline thermoplastic material is preferably a hydrocarbon polymer, such as a polymer or a copolymer of olefins or a polymer or a copolymer of aromatic hydrocarbon monomers. The said polymer can be hydrogenated, partially hydrogenated or nonhydrogenated.

The polymer according to the invention is advantageously a "tackifying" hydrocarbon resin. Such resins are described in particular in the Handbook of Pressure Sensitive Adhesives, edited by Donatas Satas, 3$^{rd}$ ed., 1989, pp. 609-619.

The hydrocarbon resins in accordance with the invention are chosen from polymers which can be classified, according to the type of monomer which they comprise, into:

indene hydrocarbon resins, such as the resins resulting from the polymerization predominantly of indene monomer with a minor proportion of monomers chosen from styrene, methylindene, methylstyrene and their mixtures, it being possible for these resins optionally to be hydrogenated. These resins can exhibit a molecular weight ranging from 290 to 1150 g/mol.

Mention may be made, as examples of indene resins, of those sold under the references Norsolene S95, Norsolene S105 and Norsolene S115 by Cray Valley, or the hydrogenated indene/methylstyrene/styrene copolymers sold under the "Regalite" name by Eastman Chemical, in particular Regalite C6100, Regalite C6100L, Regalite R1090, Regalite R1100, Regalite R7100, Regalite R9100, Regalite S1100 and Regalite S5100, or under the names Arkon P-90, Arkon P-100, Arkon P-115, Arkon M-90, Arkon M-100 and Arkon M-115 by Arakawa.

aliphatic pentanediene resins, such as those resulting from the polymerization predominantly of 1,3-pentanediene monomers (trans- or cis-piperylene) and of a monomer, in a minor amount, chosen from isoprene, butene, 2-methyl-2-butene, pentene, 1,4-pentanediene and their mixtures. These resins can exhibit a molecular weight ranging from 1000 to 2500 g/mol.

Such 1,3-pentanediene resins are sold, for example, under the references Piccotac 95 by Eastman Chemical, Escorez 1102, Escorez 1304, Escorez 1310LC and Escorez 1315 by Exxon Chemicals or Wingtack 95 by Cray Valley;

mixed pentanediene and indene resins, which result from the polymerization of a mixture of pentanediene and indene monomers, such as those described above, such as, for example, the resins sold under the references Escorez 2101, Escorez 2105, Escorez 2173, Escorez 2184, Escorez 2203LC, Escorez 2394 and Escorez 2510 by Exxon Chemicals, Norsolene A 100 by Cray Valley or Wingtack 86, Wingtack Extra and Wingtack Plus by Cray Valley, diene resins of cyclopentanediene dimers, such as those resulting from the polymerization of a first monomer chosen from indene and styrene and of a second monomer chosen from cyclopentanediene dimers, such as dicyclopentanediene, methyldicyclopentanediene, the other pentanediene dimers and their mixtures. These resins generally exhibit a molecular weight ranging from 500 to 800 g/mol, such as, for example, those sold under the references Escorez 5380, Escorez 5300, Escorez 5400, Escorez 5415, Escorez 5490, Escorez 5600, Escorez 5615 and Escorez 5690 by Exxon Mobil Chem. and the resins Sukorez SU-90, Sukorez SU-100, Sukorez SU-110, Sukorez SU-100S, Sukorez SU-200, Sukorez SU-210, Sukorez SU-490 and Sukorez SU-400 by Kolon, diene resins of isoprene dimers, such as the terpene resins resulting from the polymerization of at least one monomer chosen from β-pinene, α-pinene, limonene and their mixtures. These resins can exhibit a molecular weight ranging from 300 to 2000 g/mol. Such resins are sold, for example, under the names Piccolyte A115 by Hercules or Zonarez 7100 or Zonatac 105 Lite by Arizona Chem.

Mention may also be made of the hydrogenated resins resulting predominantly from the polymerization of pentanediene, such as those sold under the names Eastotac H-100E, Eastotac H-115E, Eastotac C-100L, Eastotac C-115L, Eastotac H-100L, Eastotac H-115L, Eastotac C-100R, Eastotac C-115R, Eastotac H-100R, Eastotac H-115R, Eastotac C-100W, Eastotac C-115W, Eastotac H-100W and Eastotac H-115W by Eastman Chemical Co.

According to a specific embodiment, the resin is chosen from the indene hydrocarbon resins sold under the names Norsolene S95, Norsolene S105 and Norsolene S115 by Cray Valley, under the "Regalite" names by Eastman Chemical, in particular Regalite C6100, Regalite C6100L, Regalite R1090, Regalite R1100, Regalite R7100, Regalite R9100, Regalite S1100 and Regalite S5100, or under the names Arkon P-90, Arkon P-100, Arkon P-115, Arkon M-90, Arkon M-100 and Arkon M-115 by Arakawa.

The noncrystalline thermoplastic polymer can be present in the composition of the backing in a content ranging from 10 to 95% by weight, with respect to the total weight of the composition, preferably ranging from 20 to 90% by weight and more preferably ranging from 40 to 80% by weight.

Noncrystalline Thermoplastic Material(s) Not Having a Softening Temperature of Less Than or Equal to $T_{S1}$:

The term "noncrystalline thermoplastic material not having a softening temperature of less than or equal to $T_{S1}$" is understood to mean either material having a softening temperature of greater than $T_{S1}$ or not having a softening temperature which can be measured with the ring-and-ball method indicated above.

In the case of a material having a softening temperature of greater than $T_{S1}$, the softening temperature is greater than the temperature $T_{S1}$ by at least 5° C. and preferably by at least 10° C.

The materials targeted according to the present invention are typically materials having a weight-average molecular weight $M_w$>50 000 g/mol, preferably >100 000 g/mol, more preferably >150 000 g/mol and more preferably >200 000 g/mol.

Advantageously, the materials targeted are materials having at least one glass transition temperature $T_{G1}$<20° C. (as measured by DMA). They can also have at least one glass transition temperature $T_{G2}$>20° C.

As preferred examples, the materials targeted are block copolymers. Use may also be made of blends of such block copolymers.

Preferably, the block copolymer comprises at least one styrene block. For example, the block copolymer is chosen from the grades of the commercial ranges Kraton D or Kraton G available from Kraton.

According to a specific embodiment, the copolymer exhibits at least one block having a glass transition temperature of less than 20° C., preferably of less than or equal to 0° C., more preferably of less than or equal to –20° C. The glass transition temperature of the said block can be between –150° C. and 20° C., in particular between –100° C. and 0° C.

The block copolymer can be a plasticizer of the polymer having a softening temperature $T_{S1}$. The term "plasticizer of the polymer" is understood to mean a compound which, in combination with a sufficient amount of the polymer, lowers the glass transition temperature thereof.

The block copolymer can in particular be a diblock, triblock, multiblock, radial or star copolymer or their blends.

Such block copolymers are described in particular in Application US-A-2002/005562 and in U.S. Pat. No. 5,221,534.

According to a first alternative form, the arrangement can comprise at least one block copolymer comprising at least one methyl methacrylate block and at least one block comprising units chosen from butyl acrylate and butadiene. Mention may in particular be made of the block copolymer of the "Nanostrength MAM" range from Arkema, in particular the reference Nanostrength MAM M-22 (methyl methacrylate/butylacrylate/methyl methacrylate triblock copolymer with a ratio of 3/2 of the butyl acrylate to the methyl methacrylate).

According to a second alternative form, use is made of at least one block copolymer comprising at least one styrene block.

Use is made, according to a specific embodiment of this alternative form, of at least one block copolymer comprising at least one styrene block and at least one block comprising units chosen from butadiene, ethylene, propylene, butylene, isoprene or one of their mixtures.

Mention may in particular be made of styrene/ethylene-propylene copolymers, styrene/ethylene-butadiene copolymers or styrene/ethylene-butylene copolymers. These diblock copolymers are sold in particular under the name Kraton® G1701E by Kraton Polymers.

Mention may also be made of styrene/ethylene-propylene/styrene copolymers, styrene/ethylene-butylene/styrene copolymers, styrene/isoprene/styrene copolymers or styrene/butadiene/styrene copolymers. These triblock copolymers are sold in particular under the names Kraton® G1650, Kraton® G1652, Kraton® D1101, Kraton® D1102, Kraton® D1160 and Kraton D-1155ES by Kraton Polymers.

Mention may also in particular be made of the copolymers of the "Nanostrength SBM" range from Arkema, in particular the references Nanostrength SBM E-20 (styrene/1,3-butadiene/methyl methacrylate triblock copolymer with a ratio between 1/1/1 and 1/1/1.5) and Nanostrength SBM E-40 (styrene/1,3-butadiene/methyl methacrylate triblock copolymer having a ratio of 3/1/2).

According to a more specific embodiment, the copolymer is a styrene/butadiene/styrene triblock copolymer.

In the article in accordance with the invention, the material or materials not having a softening temperature<$T_{S1}$ are generally used in a proportion ranging from 1 to 80%, preferably from 10 to 60%, preferably from 20 to 40%, with respect to the total weight of the backing.

The backing of the article according to the invention can additionally comprise a wax or a mixture of waxes.

Waxes:

The term "wax" is understood to mean generally a lipophilic compound which is solid at ambient temperature (25° C.), which can or cannot be changed in shape, which exhibits a reversible solid/liquid change in state and which has a melting point of greater than or equal to 30° C. which can range up to 70° C., in particular up to 60° C.

Within the meaning of the invention, the melting point corresponds to the temperature of the most endothermic peak observed by thermal analysis (DSC) as described in Standard ISO 11357 3; 1999. The melting point of the wax can be measured using a differential scanning calorimeter (DSC), for example the calorimeter sold under the name "MDSC 2920" by TA Instruments.

The measurement protocol is as follows:

A 5 mg sample of wax placed in a crucible is subjected to a first rise in temperature ranging from –20° C. to 100° C. at a heating rate of 10° C./minute, is then cooled from 100° C. to –20° C. at a cooling rate of 10° C./minute and, finally, is subjected to a second rise in temperature ranging from –20° C. to 100° C. at a heating rate of 5° C./minute. During the second rise in temperature, the variation in the difference in power absorbed by the empty crucible and by the crucible containing the sample of wax is measured as a function of the temperature. The melting point of the compound is the value of the temperature corresponding to the tip of the peak of the curve representing the variation in the difference in power absorbed as a function of the temperature.

The waxes capable of being used in the composition of the backing according to the invention are chosen from waxes of animal, vegetable, mineral or synthetic origin, and their mixtures, which are solid at ambient temperature.

The waxes which can be used in the composition of the backing according to the invention generally exhibit a hardness ranging from 0.01 MPa to 15 MPa, in particular of greater than 0.05 MPa and especially of greater than 0.1 MPa.

The hardness is determined by the measurement of the compressive force measured at 20° C. using the texture analyser sold under the name TA-XT2 by Rheo, equipped with a stainless steel cylinder with a diameter of 2 mm which is displaced at the measuring rate of 0.1 mm/s and which penetrates the wax to a penetration depth of 0.3 mm.

The measurement protocol is as follows:

The wax is melted at a temperature equal to the melting point of the wax+10° C.

The molten wax is cast in a receptacle with a diameter of 25 mm and a depth of 20 mm. The wax is recrystallized at ambient temperature (25° C.) for 24 hours, so that the surface of the wax is flat and smooth, and then the wax is stored at 20° C. for at least one hour before measuring the hardness or the tack.

The rotor of the texture analyser is displaced at a rate of 0.1 mm/s and then penetrates the wax to a penetration depth of 0.3 mm. When the rotor has penetrated the wax to the depth of 0.3 mm, the rotor is held stationary for 1 second (corresponding to the relaxation time) and is then withdrawn at the rate of 0.5 mm/s.

The value of the hardness is the maximum compressive force measured divided by the surface area of the cylinder of the texture analyser in contact with the wax.

Mention may in particular be made, by way of illustration of the waxes suitable for the invention, of hydrocarbon waxes, such as beeswax, microcrystalline waxes, paraffin waxes, polyethylene waxes, the waxes obtained by the Fischer-Tropsch synthesis and waxy copolymers, and their esters, or the waxes obtained by catalytic hydrogenation of animal or vegetable oils having linear or branched $C_8$-$C_{32}$ fatty chains. Mention may also be made of silicone waxes or fluorinated waxes.

The wax in the article in accordance with the invention is generally used in a proportion ranging from 1 to 90%, preferably from 5 to 60%, preferably from 10 to 30%, with respect to the total weight of the article.

The arrangement for making up the nails can be self-adhesive or can be rendered adhesive as it is put in place by application of an adhesive layer to the nail and/or to a surface of the false nail.

Adhesive:

Use is preferably made of a polymer or a polymeric system which can comprise one or more polymers of different natures. This adhesive material can in addition comprise a plasticizer.

The adhesive materials according to the invention can be chosen from adhesives of "Pressure Sensitive Adhesives" type, for example such as those mentioned in the "Handbook of Pressure Sensitive Adhesive Technology", 3rd Edition, D. Satas.

The adhesive materials according to the invention can in particular comprise polymers chosen from: polyurethanes; acrylic polymers; silicones, in particular from Bio-PSAs; butyl rubbers, in particular from polyisobutylenes; ethylene/vinyl acetate polymers; polyamides optionally modified by fatty chains; natural rubbers; and their blends.

They can in particular be adhesive copolymers deriving from the copolymerization of vinyl monomers with polymeric entities, such as, for example, those described in U.S. Pat. No. 6,136,296. The adhesive copolymers described in U.S. Pat. No. 5,929,173, having a polymer backbone, with a Tg varying from 0° C. to 45° C., grafted with chains deriving from acrylic and/or methacrylic monomers which have, on the other hand, a Tg varying from 50° C. to 200° C., are also capable of being suitable for the invention.

The adhesive materials according to the invention can in particular comprise polymers chosen from block or random copolymers comprising at least one monomer or a combination of monomers having a resulting polymer with a glass transition temperature below ambient temperature (25° C.), it being possible for these monomers or combinations of monomers to be chosen from butadiene, ethylene, propylene, isoprene, isobutylene, a silicone and their mixtures. Examples of such materials are block polymers of styrene/butadiene/styrene, styrene/(ethylene/butylene)/styrene or styrene/isoprene/styrene type, such as those sold under the trade names "Kraton" by Kraton or "Vector" by Dexco Polymers.

The adhesive materials according to the invention can additionally comprise tackifying resins, such as rosins or rosin derivatives, such as hydrogenated rosins, rosin esters or hydrogenated rosin esters, terpenes, aliphatic or aromatic hydrocarbon resins, phenolic resins, styrene resins and coumarone/indene resins. Mention will also be made of compounds such as shellac, gum sandarac, dammars, elemi, copals, benzoin and mastic gum.

According to a specific form of the invention, the arrangement comprises an adhesive layer which can be crosslinked on application. Preferably, the crosslinkable adhesive comprises a cyanoacrylate, such as a mixture of ethyl cyanoacrylate, of polymethyl methacrylate and of hydroquinone (available from "Francenails"). Preferably, the arrangement is sealed in a leaktight packaging in order to prevent crosslinking from becoming initiated before the arrangement is used.

According to a specific form of the invention, the adhesive layer of the article comprises at least 5%, preferably at least 10%, of residual solvent. Preferably, the arrangement is sealed in a leaktight packaging in order to prevent the solvent from evaporating before the arrangement is used.

The adhesive material in the article in accordance with the invention is generally in the form of a layer having a thickness from 1 micron to 100 microns and in particular from 5 microns to 50 microns, preferably from 10 microns to 40 microns.

IMPLEMENTATIONAL EXAMPLE

The following composition is prepared:
Norsolene S105 (Cray Valley) 70% (hydrocarbon resin)
Kraton D-1155ES (Kraton) 30% (styrene/butadiene/styrene block copolymer)

These compounds are blended at a temperature of 170° C. until a homogeneous mixture is obtained.

In practice, the hydrocarbon resin is first heated with stirring until a liquid texture is obtained and then the block copolymer is gradually incorporated.

The blend obtained (liquid at 170° C.) is coated onto a Teflon-covered backing, so as to obtain a film with a thickness of 800 μm. The film obtained is subsequently thermoformed and then cut up, so as to obtain shapes of nails with a thickness of 800 μm.

After cooling, the false nail produced is coated with a layer of coloured nail varnish on its upper face and with an adhesive layer on its lower face, the adhesive layer being coated beforehand onto a release liner. The adhesive used is a PSA adhesive which carries the reference Bio-PSA 7-4602 and which is available from Dow Corning.

During application, the release liner is removed and the arrangement is applied to the nail. A hair dryer at a temperature of approximately 70° C. is used to sufficiently soften the arrangement in order to be able to change it in shape and to match it to the shape of the nail.

The invention claimed is:

1. A method for making up a nail, the method comprising:
   i) adhesively bonding, to a nail, an article comprising a prethermoformed backing comprising a first noncrystalline thermoplastic material having a softening temperature $T_{S1}$ of less than 120° C. and a second noncrystalline thermoplastic material not having a softening temperature of less than or equal to $T_{S1}$; and then
   ii) heating the article to soften the first noncrystalline thermoplastic material and match the article to a profile of the nail.

2. The method of claim 1, wherein the first noncrystalline thermoplastic material has a weight-average molecular weight $M_W$<10 000 g/mol.

3. The method of claim 1, wherein the first noncrystalline thermoplastic material is a hydrocarbon polymer.

4. The method of claim 1, wherein the second noncrystalline thermoplastic material has a weight-average molecular weight $M_W$>50 000 g/mol.

5. The method of claim 1, wherein the second noncrystalline thermoplastic material has at least one glass transition temperature $T_{G1}$<20° C.

6. The method of claim 4, wherein the second noncrystalline thermoplastic material is a block copolymer or a blend of block copolymers.

7. The method of claim 1, wherein the backing further comprises an at least partially crystalline wax.

8. The method of claim 7, wherein the wax is a polyolefin or an olefin copolymer.

9. The method of claim 1, wherein the article comprises a face, which contacts the nail, and the face comprises a layer of an adhesive material.

10. The method of claim 1, wherein the said article has a thickness of between 300 μm and 1 mm.

11. The method of claim 1, wherein a ratio of a content of the first noncrystalline thermoplastic material to the second noncrystalline thermoplastic material is in a range from 95:1 to 1:8.

12. The method of claim 1, further comprising:
   applying, a liquid composition comprising at least one ingredient selected from the group consisting of a film-forming agent, a plasticizer, a solvent, and a coloring material to a first face of the backing on an opposite side from a second face that contacts the nail.

13. The method of claim 1, wherein the softening temperature $T_{S1}$ is less than 110° C.

14. The method of claim 1, wherein the first noncrystalline thermoplastic material is a polymer or a copolymer of an olefin or an aromatic hydrocarbon monomer.

15. The method of claim 4, wherein the second noncrystalline thermoplastic material has a weight-average molecular weight $M_W$>100 000 g/mol.

16. The method of claim 5, wherein the second noncrystalline thermoplastic material has at least one glass transition temperature $T_{G2}$>20° C.

17. The method of claim 7, wherein the wax is a homopolymer or a copolymer of at least one selected from the group consisting of ethylene and propylene.

* * * * *